United States Patent [19]

Kasori et al.

[11] Patent Number: 4,698,320

[45] Date of Patent: Oct. 6, 1987

[54] ALUMINUM NITRIDE SINTERED BODY

[75] Inventors: Mituo Kasori, Kawasaki; Kazuo Shinozaki; Kazuo Anzai, both of Tokyo; Takeshi Takano, Samukawa, all of Japan

[73] Assignee: Kabushiki Kaisha Toshiba, Kanagawa, Japan

[21] Appl. No.: 696,435

[22] Filed: Jan. 30, 1985

[30] Foreign Application Priority Data

Jun. 26, 1984 [JP] Japan .................................. 59-130106
Jun. 26, 1984 [JP] Japan .................................. 59-130113

[51] Int. Cl.$^4$ ............................................. C04B 35/58
[52] U.S. Cl. ........................................ 501/96; 501/98; 501/151
[58] Field of Search ........................ 501/96, 98, 151; 428/698

[56] References Cited

U.S. PATENT DOCUMENTS

| | | | |
|---|---|---|---|
| 2,480,473 | 8/1949 | Johnson | 501/98 |
| 3,238,018 | 3/1966 | Winter et al. | 501/98 |
| 3,503,787 | 3/1970 | Pendse | 428/698 |
| 4,519,966 | 5/1985 | Aldinger et al. | 501/96 |
| 4,547,471 | 10/1985 | Huseby et al. | 501/98 OR |

FOREIGN PATENT DOCUMENTS 1001867 7/1961 United Kingdom .

OTHER PUBLICATIONS

Slack, "Nonmetallic Crystals with High Thermal Conductivity", J. Phys. Chem. Solids, 1973, vol. 34, pp. 321–335.
Kuramoto et al., Journal of Materials Science Letters, vol. 3, pp. 471–474, 1984.
Komeya et al., Journal of the American Ceramic Society, vol. 57, No. 9, 1974.

*Primary Examiner*—William R. Dixon, Jr.
*Assistant Examiner*—Karl Group
*Attorney, Agent, or Firm*—Schwartz, Jeffery, Schwaab, Mack, Blumenthal & Evans

[57] ABSTRACT

An aluminum nitride sintered body prepared by a process comprising adding to a principal component of aluminum nitride an additional component of at least one of fluorides of alkaline earth metals selected from the group consisting of calcium (Ca), strontium (Sr) and barium (Ba) or at least one of fluorides of rare earth elements added in an amount of 0.01 to 20% by weight, followed by sintering.

16 Claims, No Drawings

ALUMINUM NITRIDE SINTERED BODY

BACKGROUND OF THE INVENTION

This invention relates to an aluminum nitride sintered body.

Aluminum nitride (hereinafter often "AlN") has high strength at a room temperature to a high temperature (ordinally, the sintered body has flexural strength of 40 kg/mm$^2$ or more), and has excellent chemical durability. Accordingly, it has been used for refractory material and, on the other hand, it has been considered promising as a material which can be used for a heat dissipation substrate of a semiconductor device, taking full advantages of its high thermal conductivity and high electric insulation. Such an aluminum nitride has no melting point and decomposes at a temperature of 2789 K. or more, and therefore has been used as a sintered body except when it is used as a thin film or the like.

Conventionally, AlN sintered bodies are produced by pressureless sintering or hot pressing. In the pressureless sintering, compounds such as oxides of alkaline earth metals or rare earth elements are often added as sintering aids for the purpose of high densification of products. In the hot pressing, sintering is carried out at a high temperature and high pressure with use of AlN alone or AlN incorporated with sintering aids.

In the hot pressing, however, there are problems such that it is possible to produce sintered bodies having complicated shapes only with great difficulty, and yet with lower productivity and higher production cost. On the other hand, in the pressureless sintering, it is possible to solve such problems as in the case of hot pressing, but the thermal conductivity of AlN sintered bodies obtained is as low as 40 to 60 W/m.k at best, while the theoretical thermal conductivity of AlN itself is 320 W/m.k. Also, in the case of AlN sintered bodies obtained by the hot pressing, the thermal conductivity is as low as about 40 W/m.k or less when no sintering aid has been added, and 40 to 60 W/m.k even when the sintering aid has been added. Moreover, among the oxides of alkaline earth metals or rare earth elements those which are attributable to the thermal conductivity exceeding 40 W/m.k have been limited to calcium oxides ($CaCO_3$) and yttrium oxides ($Y_2O_3$).

SUMMARY OF THE INVENTION

This invention aims to provide an aluminum nitride sintered body remarkably improved in thermal conductivity and having higher density.

The present inventors have conducted extensive experiments and studies on the sinterability and the thermal conductivity of AlN sintered bodies to which various sintering aids have been added. As a result, it was found that fluorides of alkaline earth metals or rare earth elements are most suited as the aids for enhancement of the thermal conductivity and the high density or densification. Although it has been well known that oxides of alkaline earth metals or rare earth metals are effective for the high densification of sintered bodies, it was found that fluorides of the same can also achieve the densification which is comparable to, or higher than, the oxides of the same, and in addition can enhance the high thermal conductivity to a greater extent.

Based on the above findings, the present inventors have made further intensive studies to confirm that the thermal conductivity can be remarkably improved and the high densification can be also achieved by providing an AlN sintered body which is sintered by adding at least one of fluorides of certain alkaline earth metals or at least one of fluorides of rare earth elements in a prescribed amount.

SUMMARY OF THE INVENTION

Accordingly, this invention is to provide an aluminum nitride sintered body prepared by a process comprising adding to a principal component of aluminum nitride an additional component comprising at least one of fluorides of alkaline earth metals selected from the group consisting of calcium (Ca), strontium (Sr) and barium (Ba) or at least one of fluorides of rare earth elements added in an amount of 0.01 to 20% by weight based on the total amount of said components, followed by sintering.

DESCRIPTION OF THE PREFERRED EMBODIMENTS

In the case of the addition of a fluoride of the alkaline earth metals, the effects for the high thermal conductivity and the high densification are expected only when at least one of the fluorides of Ca, Sr and Ba are added. It was found that a fluoride of magnesium (Mg) is not effective in obtaining the desired result and, conversely, inhibits the sinterability.

Of the fluoride of Ca, Sr and Ba, calcium fluoride ($CaF_2$) is most effective in achieving the higher thermal conductivity. When compared with it, $SrF_2$ and $BaF_2$ are slightly lower in the thermal conductivity. Such relationship is similarly found in the cases of the oxides of these, in which CaO is more effective for the high thermal conductivity than SrO and BaO are.

On the other hand, when comparing the fluorides with the oxides, $CaF_2$ is more effective for the high thermal conductivity than CaO is, and the similar relationship is also found when comparing $SrF_2$ with SrO. In either cases, the fluorides show more excellent high thermal conductivity.

Similar tendency is also found between the fluorides of rare earth elements and the oxides of the same. Namely, of the oxides of rare earth elements, $Y_2O_3$ is most effective for the high thermal conductivity, and, of the fluorides of rare earth elements on the other hand, $YF_3$ is most effective, and also, $YF_3$ is more effective for the high thermal conductivity than $Y_2O_3$ is. Similarly, when comparing the fluorides of the other rare earth elements with the oxides of the same, the fluorides are more suited for achievement of the high thermal conductivity.

It has been quite unknown in the art that the fluorides show such effects as mentioned above. Although the mechanism therefor is unclear at present, X-ray diffraction studies carried out by the present inventors to detect the constitutional phase of the sintered bodies of the present invention revealed that the phases are different from that of the sintered bodies where the oxides are used as sintering aids. Namely, taking Ca as an example and when the constitutional phases were examined as to sintered bodies produced by adding respectively, as sintering aid, $CaF_2$, and $CaCO_3$ and $CaC_2O_4.H_2O$ which can be finally led to CaO, only a phase similar to $CaO.2Al_2O_3$ was detected besides AlN phase when $CaF_2$ was used, and phases of $CaO.Al_2O_3$ and $CaO.2Al_2O_3$ were detected in substantially equal proportions in the cases when $CaCO_3$ and $CaC_2O_4.H_2O$ were used.

Similarly, taking Y (yttrium) as another example, when the constitutional phases were examined as to sintered bodies produced by adding respectively as sintering aid $YF_3$ and $Y_2O_2$, phases of $3Y_2O_3 5Al_2O_3$ and others were formed in addition to an AlN phase when $Y_2O_3$ was used, whereas an unknown phase resembling to, but apparently different from, the case of the addition of $Y_2O_3$ was detected when $YF_3$ was used.

It, however, is not necessarily clear whether the difference in the thermal conductivity results from the above difference in the constitutional phase.

Further, AlN tends to be incorporated with oxygen during synthesis step, grinding step, and so on. However, the effect of this invention is not injured if the impurity oxygen content is within the level of 20% by weight based on the AlN.

As described in the above, this invention is characterized by adding to the principal component of AlN, at least one of fluorides of alkaline earth metals selected from the group consisting of Ca, Sr and Ba or at least one of fluorides of rare earth elements in an amount of 0.01 to 20% by weight based on the total amount of the components, followed by sintering. The reason why the range of the content is limited as above is that no desired effect will not be obtained when it is less than 0.01% by weight and, on the other hand, not only the heat resistance or refractoriness and the high strength will be impaired but also the thermal conductivity will be lowered when it is more than 20% by weight.

In the following, an example is given for a preparation of an AlN sintered body according to this invention.

First, a prescribed amount of at least one of fluorides of Ca, Sr and Ba or fluorides of rare earth elements is added to AlN powder, and then mixed by using a ball mill or the like. Thereafter, in the pressureless sintering, a binder is added to the mixture, followed by mixing, kneading, granulation and regulation, to effect molding by press molding or sheet forming. Subsequently, the molded body is heated at a temperature around 700° C. in $N_2$ gas stream to remove the binder, and then it is set in a container made of graphite or aluminum nitride to effect pressureless sintering at 1600° to 1850° C. in $N_2$ gas atmosphere.

In the case of sintering by hot pressing, on the other hand, the above material mixed by a ball mill or the like is subsequently hot pressed at 1600° to 1800° C.

This invention will be described in greater detail by the following Examples and Comparative Examples.

EXAMPLE 1

First, added to AlN powder having average particle size of 1 μm was 3% by weight of $CaF_2$ powder having the same average particle size of 1 μm, followed by grinding and mixing by use of a ball mill to pepare a starting material.

Subsequently, the starting material was packed in a carbon mold of 10 mm in diameter, and then subjected to hot pressing for 1 hour under the conditions of a pressure of 400 kg/cm² and a temperature of 1800° C. to produce an AlN sintered body.

COMPARATIVE EXAMPLE 1

Only the AlN powder used in Example 1 was processed in the same manner as in Example 1 to produce an AlN sintered body.

The AlN sintered bodies obtained in the above Example 1 and Comparative Example 1 were respectively polished to have thickness of about 3.5 mm, and thereafter subjected to measurements of thermal conductivity at a room temperature according to a laser flash method. As a result, it was found to be 85 W/m.k as to the AlN sintered body of Example 1, while 32 W/m.k as to that of Comparative Example 1.

Further, constitutional phases of each of the sintered bodies were examined by X-ray diffraction to detect an AlN phase and a phase similar to $CaO.2Al_2O_3$ in the case of Example 1, and, in the case of Comparative Example 1, a phase of an oxynitride present in a considerable amount in addition to an AlN phase.

EXAMPLE 2

Added to AlN powder used in Example 1 was 3% by weight of $CaF_2$ powder having the average particle size of 1 μm, followed by grinding and mixing by use of a ball mill to prepare a starting material. Subsequently, to the starting material was added 7% by wight of paraffin, followed by granulation, and thereafter press molding under a pressure of 300 kg/cm² to form a packed powdery body of 30×30×8 mm in dimension, which was then heated to 700° C. at maximum in a nitrogen gas atmosphere to remove paraffin. Next, the resultant body was set in a carbon mold to effect pressureless sintering while heating at 1800° C. for 2 hours in a nitrogen gas atmosphere.

COMPARATIVE EXAMPLE 2

Only the AlN powder used in Example 2 was processed in the same manner as in Example 2 to produce an AlN sintered body.

The AlN sintered bodies obtained in the above Example 1 and Comparative Example 1 were respectively polished to have thickness of about 3.5 mm, and thereafter subjected to measurements of thermal conductivity at a room temperature according to a laser flash method. As a result, it was found to be 82 W/m.k as to the AlN sintered body of Example 2, while 15 W/m.k as to that of Comparative Example 2.

Also, density of each of the sintered bodies was examined to reveal that it was 3.26 g/cm³ in Example 2 and 2.38 g/cm³ in Comprative Example 2.

EXAMPLE 3

Two kinds of AlN sintered bodies were produced by the pressureless sintering in the same manner as in Example 2, except that added in place of $CaF_2$ were $SrF_2$ and $BaF_2$ in an amount of 3% by weight, respectively.

Thermal conductivity of each of the sintered bodies were examined to reveal that it was 65 W/m.k when $SrF_2$ was added, and 56 W/m.k when $BaF_2$ was added. Also, density of each of the sintered bodies was examined to reveal that it was 3.26 g/cm³ when $SrF_2$ was added and 3.25 g/cm³ when $BaF_2$ was added.

COMPARATIVE EXAMPLE 3

A sintered body produced in the same manner as in Example 3 except that $MgF_2$ was added had the thermal conductivity of 8 W/m.k and the density of 2.27 g/cm³.

EXAMPLE 4

Six kinds of AlN sintered bodies were produced by the pressureless sintering in the same manner as in Example 2, except that added as sintering aids were $CaF_2$ in amounts varied as 0.1, 0.5, 1, 5, 10 and 20% by weight, respectively.

Density and thermal conductivity of each of the sintered bodies obtained were examined to reveal the results as shown in Table 1 below, in which also shown together is the result from the sintered body (of Comprative Example 2) produced by the pressureless sintering of the AlN powder used alone as the starting material to which no $CaF_2$ was added.

TABLE 1

|  | Amount of $CaF_2$ added (wt. %) | Density (g/cm$^3$) | Thermal conductivity (W/m · k) |
| --- | --- | --- | --- |
| Comparative Example 2 | 0 | 2.38 | 15 |
| Example 4 | 0.1 | 3.15 | 43 |
| " | 0.5 | 3.21 | 72 |
| " | 1 | 3.26 | 79 |
| " | 5 | 3.28 | 83 |
| " | 10 | 3.29 | 80 |
| " | 20 | 3.17 | 65 |

EXAMPLE 5

Six kinds of AlN sintered bodies were produced by the pressureless sintering at 1800° C. for 2 hours in the same manner as in Example 2, except that added as sintering aids were $SrF_2$ in amounts varied as 0.1, 0.5, 1, 5, 10 and 20% by weight, respectively.

Density and thermal conductivity of each of the sintered bodies obtained were examined to reveal the results as shown in Table 2 below, in which also shown together is the result from the sintered body (of Comprative Example 2) produced by the pressureless sintering of the AlN powder used alone as the starting material to which no $SrF_2$ was added.

TABLE 2

|  | Amount of $SrF_2$ added (wt. %) | Density (g/cm$^3$) | Thermal conductivity (W/m · k) |
| --- | --- | --- | --- |
| Comparative Example 2 | 0 | 2.38 | 15 |
| Example 5 | 0.1 | 3.17 | 43 |
| " | 0.5 | 3.22 | 60 |
| " | 1 | 3.29 | 64 |
| " | 5 | 3.29 | 69 |
| " | 10 | 3.28 | 67 |
| " | 20 | 3.17 | 59 |

EXAMPLE 6

Six kinds of AlN sintered bodies were produced by the pressureless sintering at 1800° C. for 2 hours in the same manner as in Example 2, except that added as sintering aids were $BaF_2$ in amounts varied as 0.1, 0.5, 1, 5, 10 and 20% by weight, respectively.

Density and thermal conductivity of each of the sintered bodies obtained were examined to reveal the results as shown in Table 3 below, in which also shown together is the result from the sintered body (of Comprative Example 2) produced by the pressureless sintering of the AlN powder used alone as the starting material to which no $BaF_2$ was added

TABLE 3

|  | Amount of $BaF_2$ added (wt. %) | Density (g/cm$^3$) | Thermal conductivity (W/m · k) |
| --- | --- | --- | --- |
| Comparative Example 2 | 0 | 2.38 | 15 |
| Example 6 | 0.1 | 3.15 | 40 |
| " | 0.5 | 3.20 | 49 |
| " | 1 | 3.25 | 55 |
| " | 5 | 3.27 | 60 |
| " | 10 | 3.26 | 60 |

TABLE 3-continued

|  | Amount of $BaF_2$ added (wt. %) | Density (g/cm$^3$) | Thermal conductivity (W/m · k) |
| --- | --- | --- | --- |
| " | 20 | 3.17 | 47 |

EXAMPLE 7

Added to AlN powder having average particle size of 1 μm was 3% by weight of $YF_3$ powder having the same average particle size of 1 μm, followed by grinding and mixing by use of a ball mill to pepare a starting material.

Subsequently, the starting material was packed in a carbon mold of 10 mm in diameter, and then subjected to hot pressing for 1 hour under the conditions of a pressure of 400 kg/cm$^2$ and a temperature of 1800° C. to produce an AlN sintered body.

The AlN sintered body thus obtained was processed and subjected to measurements of thermal conductivity at a room temperature in the same manner as in Example 1. As a result, the thermal conductivity was found to be 82 W/m.k.

Further, constitutional phase of the sintered body was examined by X-ray diffraction to reveal that detected was an AlN phase and the unknown phases mentioned herein above.

EXAMPLE 8

Added to AlN powder used in Example 1 was 3% by weight of $YF_3$ powder having the average particle size of 1 μm, followed by the same procedures as in Example 2 to produce an AlN sintered body. The thermal conductivity similarly examined on the product was found to be 80 W/m.k, and the density thereof 3.28 g/cm$^3$.

EXAMPLE 9

AlN sintered bodies were produced in the same manner as in Example 2, except that added in place of $YF_3$ were fluorides of various rare earth elements in an amount of 3% by weight, respectively.

Density and thermal conductivity of the AlN sintered bodies obtained were examined to give the results as shown in Table 4.

TABLE 4

| Additive | Density (g/cm$^3$) | Thermal conductivity (W/m · k) |
| --- | --- | --- |
| $LaF_3$ | 3.33 | 72 |
| $CeF_3$ | 3.29 | 69 |
| $PrF_3$ | 3.29 | 60 |
| $NdF_3$ | 3.29 | 63 |
| $SmF_3$ | 3.29 | 61 |
| $EuF_3$ | 3.29 | 62 |
| $GdF_3$ | 3.28 | 60 |
| $TbF_3$ | 3.29 | 63 |
| $DyF_3$ | 3.28 | 60 |
| $HoF_3$ | 3.28 | 61 |
| $ErF_3$ | 3.28 | 59 |
| $TmF_3$ | 3.28 | 63 |
| $YbF_3$ | 3.28 | 60 |
| $LuF_3$ | 3.28 | 62 |

EXAMPLE 10

From powdery mixtures comprising $YF_3$ added in amounts varied as 0.1, 0.5, 1, 5, 10 and 20% by weight, respectively, produced by hot pressing were six pieces of sintered bodies in the same manner as in Example 7.

Also, from the above powdery mixtures, produced by pressureless sintering were six pieces of sintered bodies in the same manner as in Example 8.

Density and thermal concuctivity of each of the AlN sintered bodies obtained as above were examined to give the results shown in Table 5.

TABLE 5

| Amount of YF$_3$ added (wt. %) | Hot pressed sintered body | | Pressureless sintered body | |
|---|---|---|---|---|
| | Density (g/cm$^3$) | Thermal conductivity (W/m · k) | Density (g/cm$^3$) | Thermal conductivity (W/m · k) |
| 0.1 | 3.31 | 54 | 2.97 | 46 |
| 0.5 | 3.32 | 69 | 3.18 | 57 |
| 1 | 3.32 | 79 | 3.25 | 78 |
| 5 | 3.32 | 81 | 3.31 | 82 |
| 10 | 3.33 | 80 | 3.29 | 81 |
| 20 | 3.33 | 82 | 3.01 | 80 |

COMPARATIVE EXAMPLES 4 and 5

An AlN sintered body was produced in the same manner as in Example 2, except that CaCO$_3$ was used in place of CaF$_2$. Also produced was another AlN sintered body in the same manner as in Example 7, except that Y$_2$O$_3$ was used in place of YF$_3$ used in Example 7. On the AlN sintered bodies thus obtained, thermal conductivity and sinter density were examined in the same manner as done in Example 1 to obtain the results shown in Table 6, in which the results of Example 2 and Example 8 are also shown together comparatively.

TABLE 6

| | Additive | Amount (wt. %) | Thermal conductivity (W/m · k) | Density (g/cm$^3$) |
|---|---|---|---|---|
| Example 2 | CaF$_2$ | 3 | 82 | 3.26 |
| Comparative Example 4 | CaCO$_3$ | 3 | 49 | 3.24 |
| Example 8 | YF$_3$ | 3 | 80 | 3.28 |
| Comparative Example 5 | Y$_2$O$_3$ | 3 | 58 | 3.29 |

As described above in detail, it is possible according to this invention to produce a sintered body with high thermal conductivity by addition of fluorides of certain alkaline earth metals or fluorides rare earth elements, which has been unknown in the art, whereupon it is possible to provide an aluminum nitride sintered body with high thermal conductivity and high density, being useful, for example, for a heat dispersion substrate of a semiconductor device.

We claim:

1. An aluminum nitride sintered body prepared by a process comprising the steps of (1) providing a mixture which consists essentially of aluminum nitride and a sintering aid which consists essentially of at least one fluoride of an alkaline earth metal selected from the group consisting of calcium, strontium and barium or at least one fluoride of a rare earth in an amount of 0.01 to 20% by weight, based on the total amount of said component; and (2) sintering said mixture to produce an aluminum nitride sintered body having a thermal conductivity of at least about 40 W/m.k.

2. The aluminum nitride sintered body according to claim 1, wherein said sintering aid is calcium fluoride.

3. The aluminum nitride sintered body according to claim 1, wherein said sintering aid is yttrium fluoride.

4. The aluminum nitride sintered body according to claim 1, wherein step (2) consists essentially of sintering said mixture at about 1600° C. to 1850° C. in a N$_2$ gas atmosphere.

5. The aluminum nitride sintered body according to claim 4, wherein said sintering in a N$_2$ gas atmosphere is about 2 hours in duration.

6. The aluminum nitride sintered body according to claim 1, wherein step (2) consists of hot pressing said mixture at about 1600° to 1800° C.

7. The aluminum nitride sintered body according to claim 6, wherein said hot pressing is about 1 hour in druation.

8. The aluminum nitride sintered body according to claim 1, wherein said sintering aid consists essentially of at least one from the group consisting of calcium fluoride, strontium fluoride and barium fluoride 9. A process for preparing an aluminum nitride sintered body, comprising the steps of
(1) providing a mixture which consists essentially of aluminum nitride and a sintering aid which consists essentially of at least one fluoride of an alkaline earth metal selected from the group consisting of calcium, strontium and barium or at least one fluoride of a rare earth element in an amount of 0.01 to 20% by weight, based on the total amount of said component; and
(2) sintering said mixture to produce an aluminum nitride sintered body having a thermal conductivity of at least 40 W/m.k.

10. The process according to claim 9, wherein said sintering aid is calcium fluoride.

11. The process according to claim 9, wherein said sintering aid is yttrium fluoride.

12. The process according to claim 9, wherein step (2) consists essentially of sintering said mixture at about 1600° to 1850° C. in a N$_2$ gas atmosphere.

13. The process according to claim 12, wherein said sintering in a N$_2$ gas atmosphere is about 2 hours in duration.

14. The process according to claim 9, wherein step (2) consists essentially of hot pressing said mixture at about 1600° to 1800° C.

15. A process according to claim 14, wherein said hot pressing is about 1 hour in duration.

16. A process according to claim 9, wherein said sintering aid consists essentially of at least one from the group consisting of calcium fluoride, strontium fluoride and barium fluoride

* * * * *